(12) United States Patent
Kubota et al.

(10) Patent No.: US 6,485,138 B1
(45) Date of Patent: Nov. 26, 2002

(54) INK JET RECORDING INK AND RECORDING METHOD

(75) Inventors: Kazuhide Kubota; Kazuaki Watanabe; Kiyohiko Takemoto; Toshiyuki Miyabayashi, all of Suwa (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/281,417

(22) Filed: Mar. 30, 1999

Related U.S. Application Data

(62) Division of application No. 08/803,399, filed on Feb. 20, 1997.

(30) Foreign Application Priority Data

Feb. 22, 1996 (JP) ............................................... 8-35249

(51) Int. Cl.$^7$ .................................................. B41J 2/17
(52) U.S. Cl. ......................................... 347/96; 347/100
(58) Field of Search ................... 347/96, 100; 428/195; 106/31.58

(56) References Cited

U.S. PATENT DOCUMENTS

| | | | |
|---|---|---|---|
| 4,554,555 A | 11/1985 | Aruga et al. .................. 346/1.1 |
| 4,666,519 A | * 5/1987 | Akiyama et al. ......... 106/31.58 |
| 4,740,420 A | 4/1988 | Akutsu et al. ............... 428/341 |
| 4,910,084 A | 3/1990 | Yamasaki et al. ......... 428/411.1 |
| 5,178,944 A | 1/1993 | Horiuchi et al. ............. 428/341 |
| 5,476,540 A | 12/1995 | Shields et al. ................. 106/20 |
| 5,496,634 A | 3/1996 | Ogawa et al. ............... 428/341 |
| 5,792,249 A | * 8/1998 | Shirota et al. ............... 347/100 |
| 5,948,512 A | * 9/1999 | Kubota et al. ............... 428/195 |
| 6,084,619 A | * 7/2000 | Takemoto et al. ............. 347/96 |

FOREIGN PATENT DOCUMENTS

| | | | |
|---|---|---|---|
| EP | 0355062 | 2/1990 | |
| EP | 0466345 | 1/1992 | |
| EP | 0497522 | 8/1992 | |
| EP | 0534634 | 3/1993 | |
| JP | 52154409 | 12/1977 | |
| JP | 5731591 | 2/1982 | |
| JP | 57107880 | 7/1982 | |
| JP | 6322306 | 11/1982 | |
| JP | 58193185 | 11/1983 | |
| JP | 59199780 | 11/1984 | |
| JP | 61061887 | 3/1986 | |
| JP | 01040371 | 2/1989 | |
| JP | 03240557 | 10/1991 | |
| JP | 03240558 | 10/1991 | |
| JP | 4259590 | 9/1992 | |
| JP | 5117562 | 5/1993 | |
| JP | 5202328 | 8/1993 | |
| JP | 06049402 A | * 2/1994 | .............. 106/31.58 |
| JP | 06106735 | 4/1994 | |
| JP | 8319442 | 12/1996 | |

OTHER PUBLICATIONS

Patent Abstract of Japan JP 01–040371 Of Feb. 10, 1989.
Patent Abstract of Japan JP 57–107880 Of Jul. 5, 1982.

(List continued on next page.)

Primary Examiner—John Barlow
Assistant Examiner—Manish S. Shah
(74) Attorney, Agent, or Firm—Ladas & Parry

(57) ABSTRACT

An ink jet recording method comprising the step of printing two solutions of a first solution and an ink composition is provided which, even in the case of printing on a recycled paper, can realize a good printed image, especially an image having no significant feathering and free from unevenness of printing and an image free from color bleeding. A first solution containing a polyvalent metal salt and/or a polyallylamine is used in combination with an ink composition containing an inorganic oxide colloid, and optionally an epoxy-containing compound. Specifically, the first solution is deposited onto a recording medium, and the ink composition is then deposited by ink jet printing to perform printing.

9 Claims, 3 Drawing Sheets

OTHER PUBLICATIONS

Patent Abstract of Japan JP 58–193185 Of Nov. 10, 1983.
Patent Abstract of Japan JP 61–061887 Of Mar. 29, 1986.
Patent Abstracts of Japan JP 57–31591 Of Feb. 20, 1982.
Patent Abstracts of Japan of JP 6–322306 Of Nov. 22, 1994.
Patent Abstracts of Japan Of JP 8–319442 Of Dec. 3, 1996.
Patent Abstracts of Japan Of JP 4–259590 Of Sep. 16, 1992.
Patent Abstracts of Japan Of JP 59–199780 Of Nov. 12, 1984.
Derwent Abstracts Of Japan Of JP 52–154409 Of Dec. 22, 1977.
Derwent Abstracts Of Japan Of JP 51–17562 Of May 14, 1993.
Japan Patent Office Abstract Of JP 06106735.
Japan Patent Office Abstract Of JP 03240557.
Japan Patent Office Abstract of JP 03240558.
Derwent Abstract Of JP 5202328.

* cited by examiner

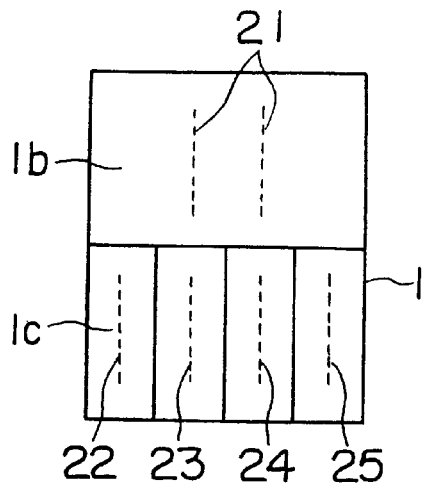
F I G. 2
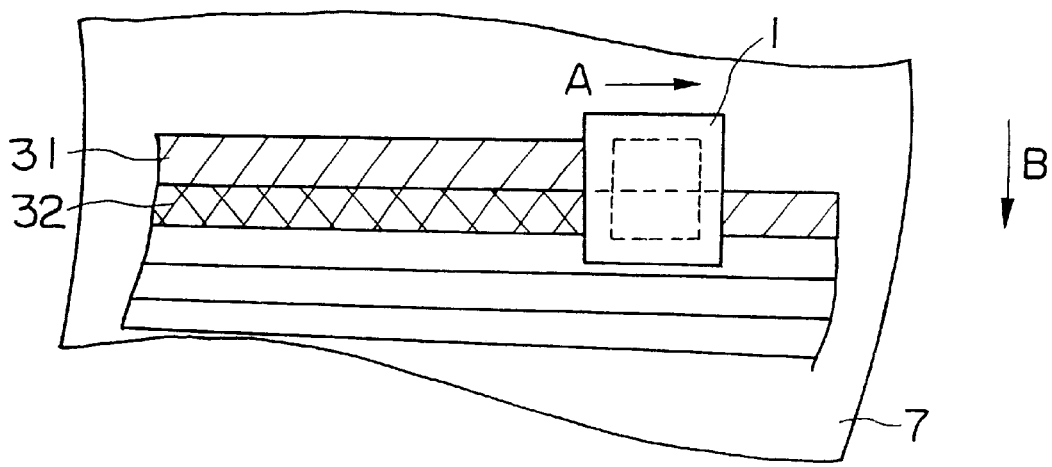
F I G. 3
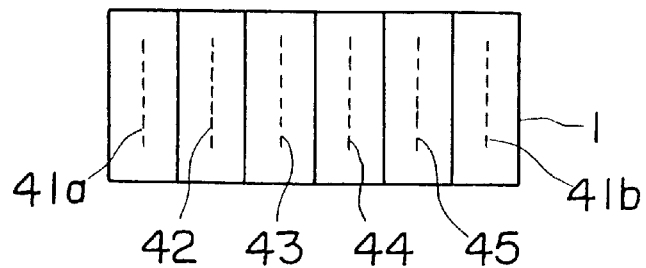
F I G. 4

INK JET RECORDING INK AND RECORDING METHOD

This is a division of application Ser. No. 08/803,339 filed Feb. 20, 1997.

FIELD OF THE INVENTION

The present invention relates to an ink jet recording method. More particularly, the present invention relates to an ink jet recording method wherein both a reaction solution and an ink composition are deposited onto a recording medium.

BACKGROUND ART

An ink jet recording method is a printing method wherein droplets of an ink composition are ejected and deposited onto a recording medium such as paper. This method has a feature that an image having a high resolution and a high quality can be realized at a high speed with a relatively inexpensive apparatus. In general, the ink composition used in the ink jet recording method comprises water as a main component and, added thereto, a colorant and a wetting agent such as glycerin added for prevention of clogging and other purposes.

On the other hand, a new ink jet recording method has been recently proposed. The new method comprises applying a polyvalent metal salt solution onto a recording medium and then applying an ink composition containing a dye having at least one carboxyl group (e.g., Japanese Patent Laid-Open No. 202328/1993). According to this method, polyvalent metal ions combine with the dye to form an insoluble composite which can provide an image having water resistance and a high quality free from color bleeding.

Further, an ink jet recording method has been proposed wherein a color ink containing at least a surfactant or a penetrable solvent and a salt for imparting a penetrating property is used in combination with a black ink which cooperates with the salt to cause thickening or coagulation, thereby providing a high-quality color image having a high image density and free from color bleeding (Japanese Patent Laid-Open No. 106735/1994). More specifically, in this method, two liquids, i.e., a first liquid containing a salt and a second liquid of an ink composition, are printed to provide a good image.

Furthermore, other ink jet recording methods wherein two liquids are printed have been proposed, for example, in Japanese Patent Laid-Open No. 240557/1991 and No. 240558/1991.

In the above ink jet recording method wherein two liquids are printed, a need still exits for the following properties.

At the outset, an improvement in fixability of the colorant is required. In recent years, recycled papers have become used instead of wood free papers. For the recycled papers, the penetration of an ink is in general better than that for the wood free papers. For this reason, a high-quality image is formed on the wood free papers, whereas feathering or color bleeding is often created in the image formed on the recycled papers. Therefore, for recycled paper, the elimination of the feathering or color bleeding has been desired in the art.

Secondly, a reduction in uneven printing is required. The uneven printing refers to a variation in color density in the print derived from localization of a colorant on the paper. Although the uneven printing poses no significant problem in printing of letters of regular size, it is a serious problem in applications where figures, graphs and the like are printed.

Thirdly, broadening the range of usable colorants is required. Most of ink jet recording methods where two liquids are printed utilize a salting-out phenomenon between a metal ion and a carboxyl ion contained in the colorant so that the colorant should have a carboxyl group. Some dyes, however, contain a water-soluble group other than the carboxyl group. For example, some dyes may dissolve with a sulfonic group. A recording method which permits the use of dyes having a group other than a carboxyl group has been desired in the art.

SUMMARY OF THE INVENTION

The present inventors have now found that, in the ink jet recording method wherein two liquids are printed, the use of an ink composition with an oxide colloid added thereto can provide a good print. The present invention has been made based on such finding.

Accordingly, a general object of the present invention is to provide an ink jet recording method involving printing of two liquids which can realize a good image.

A more specific object of the present invention is to provide an ink jet recording method involving printing of two liquids which can realize a good image even on recycled paper.

Another object of the present invention is to provide an ink jet recording method involving printing of two liquids which can realize an image free from uneven printing.

A further object of the present invention is to provide an ink jet recording method involving printing of two liquids which enables a wide range of colorants to be usable.

The above object can be attained, according to the present invention, by an ink jet recording method comprising the step of depositing a reaction solution and an ink composition onto a recording medium to perform printing, wherein the reaction solution contains a polyvalent metal salt and/or polyallylamine and the ink composition comprises at least a colorant, an inorganic oxide colloid, and an aqueous solvent.

BRIEF DESCRIPTION OF THE DRAWINGS

FIG. 2 is an enlarged view showing the surface of nozzles for a recording head, wherein reference character 1b designates the surface of a nozzle for a reaction solution and 1c the surface of a nozzle for an ink composition;

FIG. 3 is a diagram illustrating ink jet recording using the recording head shown in FIG. 2, wherein numeral 31 designates a region where a reaction solution has been deposited and numeral 32 a printed region where an ink composition has been printed on the deposited reaction solution;

FIG. 4 shows another embodiment of the recording head according to the present invention, wherein all ejection nozzles are arranged in lateral direction;

DETAILED DESCRIPTION OF THE INVENTION

Ink jet recording method

Figure 1:
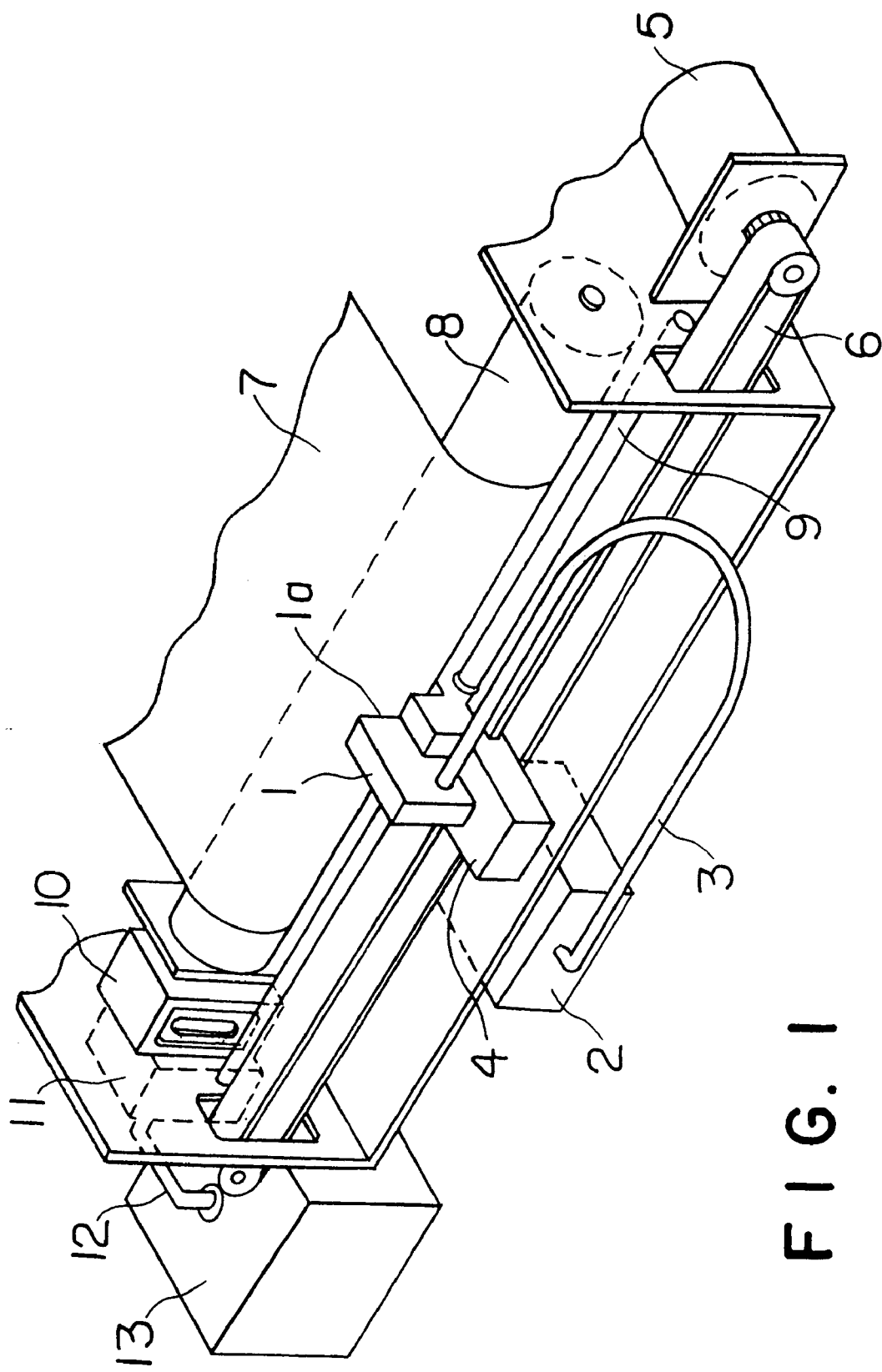
FIG. 1 shows an embodiment of the ink jet recording apparatus according to the present invention, wherein a recording head is provided separately from an ink tank to feed an ink composition and a reaction solution into a recording head through an ink tube.

The ink jet recording method according to the present invention comprises the step of printing a reaction solution and an ink composition on a recording medium.

The reaction solution and the ink composition may be applied on a recording medium in any sequence. Specifically, any of the following methods may be suitably used: a method wherein a reaction solution is deposited onto a recording medium followed by deposition of an ink composition onto the recording medium with the reaction solution deposited thereon, a method wherein an ink composition is printed followed by deposition of the reaction solution, and a method wherein a reaction solution and an ink composition are mixed together immediately before or immediately after ejection thereof.

According to the ink jet recording method of the present invention, good printing can be realized by bringing a reaction solution into contact with an ink composition. Although the present invention is not intended to be bound by the following hypothesis, the reason why good printing can be achieved by the present invention is believed as follows. Upon contact of the reaction solution with the ink composition, the polyvalent metal ion or the polyallylamine contained in the reaction solution breaks the state of dispersion of a colorant, an inorganic oxide colloid, and other ingredients, resulting in agglomeration of these ingredients. In particular, the polyvalent metal ion or the polyallylamine contained in the reaction solution is reacted with the inorganic oxide colloid contained in the ink composition to form agglomerates which inhibit the penetration of the colorant into the recording medium. Colloidal particles left on the recording medium are deposited onto the recording medium, and the particles are bound to one another to form a film, accelerating the fixation of the colorant onto the recording medium. Thus, an image having high color density and free from feathering and uneven printing could be realized. Further, in a color image, uneven color mixing in boundaries of different colors, that is, color bleeding, can also be advantageously prevented. The above mechanism is hypothetical, and the present invention should not be construed to be limited by this mechanism.

As described above, in the present invention, the inorganic oxide colloid is reacted with the polyvalent metal ion or the polyallylamine contained in the reaction solution to efficiently form agglomerates. Thus, a good printed image can be realized even when the colorant, together with the polyvalent metal ion or the polyallylamine, is less likely to form an agglomerate. This means that the method according to the present invention does not limit the kind of the colorant used and permits a wide variety of colorants to be used, which is a great advantage of the present invention.

The deposition of the reaction solution onto the recording medium may be carried out by any of an embodiment where the reaction solution is selectively deposited on only an area where the ink composition is to be deposited and an embodiment where the reaction solution is deposited on the whole surface of paper. The former embodiment can minimize the consumption of the reaction solution and, hence, is cost-effective. In this embodiment, however, an accuracy is required to some extent with respect to the position where both the reaction solution and the ink composition are deposited. On the other hand, for the latter embodiment, the requirement for the accuracy of the position where the reaction solution and the ink composition are deposited is relaxed as compared with the former embodiment. In this embodiment, however, since the reaction solution is deposited in a large amount on the whole surface of paper, the paper is likely to cause curling during drying. For the above reason, the selection of the embodiment may be determined by taking a combination of the ink composition with the reaction solution into consideration. In the case of the former embodiment, the deposition of the reaction solution can be performed by ink jet recording.

As described below, the reaction solution may contain a colorant so as to function also as an ink composition.

Ink composition

The ink composition used in the present invention comprises at least a colorant, an inorganic oxide colloid, and an aqueous solvent.

Inorganic oxide colloid

The inorganic oxide colloid which is also called "inorganic oxide sol" used in the present invention refers to a colloidal solution comprising: a dispersion medium composed of water or water and an organic solvent having good compatibility with water; and a dispersoid composed of ultrafine particles of an inorganic oxide. Inorganic oxides usable herein include, but are not limited to, high-molecular weight silicic anhydride ($SiO_2$) and alumina ($Al_2O_3$). The particle diameter of the ultrafine particles of the inorganic oxide is generally about 1 to 100 nm, preferably 1 to 20 nm, more preferably 1 to 10 nm. The dispersion medium for the inorganic oxide colloid is generally water or a mixed solvent composed of water and an organic solvent having good compatibility with water, for example, methanol, ethanol, isopropyl alcohol, or n-propanol. The inorganic oxide colloid is prepared by dispersing ultrafine particles of the inorganic oxide into water or the above organic solvent. A dispersion of the ultrafine particles in water is called an "aqueous sol," and a dispersing of the ultrafine particles in an organic solvent is called an "organosol."

As described above, the inorganic oxide colloid used in the present invention should interact with the polyvalent metal salt and/or polyallylamine to form agglomerates.

The inorganic oxide colloid may be a commercially available one, and specific examples thereof include: Snowtex S, Snowtex N, Snowtex C, Snowtex SS, Snowtex XS, Snowtex 20, Snowtex 30, and Snowtex 40, manufactured by Nissan Chemical Industry Ltd., Cataloid SI-350, Cataloid SI-500, Cataloid SI-30, Cataloid S-20L, Cataloid S-20H, Cataloid S-30L, Cataloid S-30H, and Cataloid SI-40, manufactured by E. I. du Pont de Nemours & Co.), which are dispersions of ultraviolet particles of high-molecular weight silicic anhydride in water; Aluminasol 100, Aluminasol 200, and Aluminasol 520, manufactured by Nissan Chemical Industry Ltd., which are dispersions of ultrafine particles of alumina in water; and OSCAL-1432 (isopropyl alcohol sol, manufactured by Catalysts and Chemicals Industries Co., Ltd.) which is a dispersion of ultrafine particles of high-molecular weight silicic anhydride in an organic solvent. Most of the commercially available colloidal solutions of inorganic oxides have pH adjusted to the acidic or alkaline. This is because the pH region where the inorganic oxide colloid exists stably is on the acidic or alkaline side. Therefore, when the addition of a commercially available inorganic oxide colloidal solution to the ink is contemplated, it should be made by taking into consideration the pH region, where the inorganic oxide colloid exists stably, and the pH value of the ink.

The amount of the inorganic oxide colloid added may be suitably determined by taking into consideration the type and agglomerate. In general, however, it is preferably about 0.1 to 15% by weight, more preferably about 0.5 to 5.0% by weight, based on the ink composition. A plurality of inorganic oxide colloids may be added.

Colorant

The colorant contained in the ink composition according to the present invention may be any of a dye and a pigment. In the present invention, the following wide variety of colorants may be utilized.

Dyes usable herein include various dyes commonly used in ink jet recording, such as direct dyes, acid dyes, foodstuff dyes, basic dyes, reactive dyes, disperse dyes, vat dyes, soluble vat dyes, and reactive disperse dyes.

Regarding the pigment, inorganic and organic pigments are usable without any particular limitation. Examples of the inorganic pigment include, in addition to titanium oxide and iron oxide, carbon blacks produced by known processes, such as contact, furnace, and thermal processes. Examples of the organic pigment include azo pigments (including azo lake, insoluble azo pigment, condensed azo pigment, and chelate azo pigment), polycyclic pigments (for example, phthalocyanine, perylene, perinone, anthraquinone, quinacridone, dioxazine, thioindigo, isoindolinone, and quinophthalone pigments), dye chelates (for example, basic dye chelates and acid dye chelates), nitro pigments, nitroso pigments, and aniline black.

According to a preferred embodiment of the present invention, the above pigment is preferably added in the form of a pigment dispersion prepared by dispersing the pigment in an aqueous medium with the aid of a dispersant or a surfactant. Preferred dispersants include those commonly used in the preparation of a dispersion of a pigment, for example, polymeric dispersant. In this connection, that the dispersant and the surfactant contained in the dispersion of the pigment function also as the dispersant and the surfactant for the ink composition will be apparent to a person having ordinary skill in the art.

The amount of the pigment added to the ink is preferably about 0.5 to 25% by weight, more preferably about 2 to 15% by weight.

Aqueous Solvent

The aqueous solvent as a main solvent of the ink composition of the present invention comprises basically an water-soluble organic solvent and water. The water-soluble organic solvent is preferably a low-boiling organic solvent, and preferred examples thereof include methanol, ethanol, n-propyl alcohol, iso-propyl alcohol, n-butanol, sec-butanol, tert-butanol, iso-butanol, and n-pentanol. Monohydric alcohols are particularly preferred. The low-boiling organic solvent has the effect of shortening the time taken for drying the ink.

Further, according to a preferred embodiment of the present invention, the aqueous solvent further comprises a wetting agent comprising a high-boiling organic solvent. Preferred examples of high-boiling organic solvents usable herein include polyhydric alcohols such as ethylene glycol, diethylene glycol, triethylene glycol, polyethylene glycol, polypropylene glycol, propylene glycol, butylene glycol, 1,2,6-hexanetriol, thioglycol, hexylene glycol, glycerin, trimethylolethane, and trimethylolpropane; alkyl ethers of polyhydric alcohols, such as ethylene glycol monomethyl ether, ethylene glycol monobutyl ether, diethylene glycol monomethyl ether, diethylene glycol monoethyl ether, diethylene glycol monobutyl ether, triethylene glycol monomethyl ether, triethylene glycol monoethyl ether, and triethylene glycol monobutyl ether; urea; 2-pyrrolidone; N-methyl-2-pyrrolidone; 1,3-dimethyl-2-imidazolidinone; and triethanolamine.

The amount of the wetting agent added is preferably in the range of from 0.5 to 40% by weight, more preferably in the range of from 2 to 20% by weight, based on the ink. The amount of the low-boiling organic solvent added is preferably 0.5 to 10% by weight, more preferably in the range of from 1.5 to 6% by weight, based on the ink.

The ink composition used in the present invention may contain a surfactant. Preferred examples thereof include surfactants such as anionic surfactants, nonionic surfactants, and amphoteric surfactants, alcohol such as methanol, and iso-propyl alcohol, and polyalcohol lower alkyl ether such as ethylene glycol mono-methyl ether, diethylene glycol mono-methyl ether, diethylene glycol mono-butyl ether, triethylene glycol mono-butyl ether, propylene glycol mono-methyl ether, and dipropylene glycol mono-methyl ether.

Further, if necessary, pH adjustors, preservatives, antimolds and the like may be added. Examples of pH adjustors include KOH, NaOH, triethanolamine.

Saccharide

The ink composition used in the present invention may further comprise a saccharide. The addition of the saccharide can further improve the color density, minimizing feathering and uneven printing. Further, in the case of a color image, color bleeding can be prevented on a high level. Specific examples of saccharides usable herein include monosaccharides, disaccharides, oligosaccharides (including trisaccharides and tetrasaccharides), and other polysaccharides, preferably glucose, mannose, fructose, ribose, xylose, arabinose, galactose, aldonic acid, glucitol, sorbitol, maltose, cellobiose, lactose, sucrose, trehalose, and maltotriose. The term "poloysaccharide" used herein means saccharides in the broad sense as including substances which exist widely in the world of nature, such as alginic acid, α-cyclodextrin, and cellulose. Derivatives of these saccharides usable herein include reducing sugars of the above saccharides (for example, sugar alcohols represented by the general formula $HOCH_2(CHOH)_nCH_2OH$, wherein n is an integer of 2 to 5), oxidizing sugars (for example, aldonic acid or uronic acid), amino acids, and thiosugars. Among them, sugar alcohols are particularly preferred, and specific examples thereof include maltitol and sorbitol.

The content of the saccharide is suitably 0.1 to 40% by weight, preferably 0.5 to 30% by weight, based on the ink composition.

Epoxy-containing compound and epoxy curing agent

According to a preferred embodiment of the present invention, the ink composition according to the present invention contains an epoxy-containing compound. The term "epoxy-containing compound" used herein means a compound which has at least two epoxy groups in its molecular structure and causes a crosslinking reaction, in which an epoxy group is involved, resulting in resinification (i.e., increased molecular weight). The addition of the epoxy-containing compound permits good scratch resistance and water resistance to be imparted to the printed image.

Epoxy-containing compounds usable in the present invention include compounds containing an epoxy group and, in addition, a functional group reactive with an epoxy group and compounds containing an epoxy group but not containing a functional group reactive with an epoxy group.

The term "functional group reactive with an epoxy group" used herein means a functional group which is reacted with an epoxy group to cause crosslinking, and examples of such functional groups include hydroxyl, carboxyl, and sulfonic groups. In the present invention, the use of the epoxy-containing compound having a functional group reactive with an epoxy group can eliminate; the need to add an epoxy curing agent, described below, to the reaction solution. On the other hand, the addition of an epoxy curing agent to the reaction solution in combination with the use of the epoxy-containing compound having a functional group reactive with an epoxy group results in further improved fixation rate of the print. Any one of these advantages may be selected depending upon situation.

The mechanism through which the addition of an epoxy-containing compound to the ink composition according to the present invention can offer a good print is believed as follows. However, the following mechanism is hypothetical, and the present invention should not be construed to be limited by this mechanism.

In the method according to the present invention, a reaction solution is and an ink composition are deposited onto a recording medium. As described above, upon the deposition of the ink composition onto the recording medium, interaction between a polyvalent metal ion derived from a polyvalent metal salt or a polyallylamine in the reaction solution and an inorganic oxide colloid in the ink composition results in agglomeration. When the reaction solution contains an epoxy-curing agent, crosslinking of the epoxy group in the epoxy-containing compound occurs resulting in resinification. On the other hand, it is considered that when the compound having a functional group reactive with an epoxy group is used as the epoxy-containing compound, the resinification proceeds through the following mechanism despite the absence of an epoxy-curing agent. When the distance between the epoxy-containing compounds is decreased by the agglomeration due to the interaction between the polyvalent meal salt or the polyallylamine in the reaction solution and the inorganic oxide colloid in the ink composition, a reaction of the epoxy group with the functional group reactive with the epoxy group would occur among adjacent epoxy-containing compounds. This reaction is considered to cause crosslinking among the epoxy-containing compounds, resulting in resinification. The resinification permits a printed image to be strongly fixed to the recording medium and, in addition, results in the formation of a resin film on the surface of the printed image. Such a print is considered to have good scratch resistance, waterfastness, and lightfastness.

In this context, it should be noted that a reaction between the epoxy-containing compounds each having a functional group reactive with an epoxy group in the ink composition is apparently unfavorable. Therefore, preferably, use of such epoxy-containing compounds is avoided.

Epoxy-containing compounds which may be preferably used in the present invention include epoxy-containing resin emulsions and water-soluble epoxy compounds.

According to a preferred embodiment of the present invention, epoxy-containing resin emulsions include an epoxy-containing acrylic resin emulsion comprising: a continuous phase of water; and a dispersed phase comprising a copolymer comprised of recurring units represented by the following formulae (I) and (II):

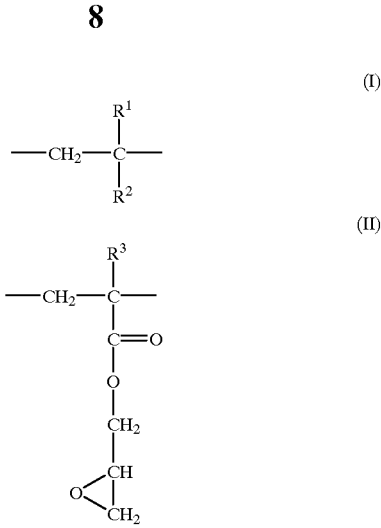

wherein
$R^1$ and $R^3$ each independently represent H or $CH_3$;
$R^2$ represents a group containing in its structure at least one group selected from alkyl (with $C_{1-21}$ alkyl being preferred), hydroxyl, carboxyl and sulfonic groups. This resin is not limited by the form of copolymers, and, for example, a block copolymer and a random copolymer are possible.

For the above copolymers, the terminal thereof has no essential influence on the properties because the polymer has a high molecular weight. In general, a fragment of a polymerization initiator constitutes the terminal, and examples of such fragments include fragments of ammonium persulfate and potassium persulfate, such as $—OSO_3H$.

Examples of preferred $R^2$ include —OH, —COOH, or —COO—R (wherein R represents a straight or branched alkyl group, preferably a $C_{1-12}$ alkyl group with at least one hydrogen atom on the alkyl group being optionally substituted by a hydroxyl, phosphono, or sulfonic group), and an aryl group substituted by a sulfonic group such as for example, a phenyl or tolyl group. Specific examples of the group represented by $R^2$ include —OH, —COOH, $—COOCH_2CH_2OH$, $—COOCH_2CH(CH_3)OH$, $—COOCH_2CH_2PO(OH)_2$, $—C_6H_5SO_3H$, $—COOCH_2CH_2SO3H$, $—COOCH_3$, $—COOC_2H_5$, $—COOC_4H_9$, $—COOC_6H_{13}$, $—COO(CH_2)_{11}CH$, and $—COOCH_2CH(CH_3)CH_2C(CH_3)_3$. In this context, a hydroxyl, carboxyl, or sulfonic group which may be contained in $R^2$ is a functional group reactive with an epoxy group. Therefore, when $R^2$ contains an alkyl group alone and when $R^2$ contains a hydroxyl, carboxyl, or sulfonic group but does not substantially react with an epoxy group, the resin emulsion does not have any functional group reactive with an epoxy group. On the other hand, when $R^2$ contains a hydroxyl, carboxyl, or sulfonic group in addition to an alkyl group, the resin emulsion has a functional group reactive with an epoxy group.

Commercially available resin emulsions may be used, and examples thereof include Almatex Z116 (manufactured by Mitsui Toatsu Chemicals, Inc.), NEW COAT S2170 and NEW COAT S-1080 (manufactured by Shin-Nakamura Chemical Co., Ltd.), VANATEX #952 and VANATEX HG-9 (manufactured by Shin-Nakamura Chemical Co., Ltd.), and Piestex B-3 (manufactured by Shin-Nakamura Chemical Co., Ltd.).

The water-soluble epoxy compound comprises at least two, per molecule, epoxy groups reactive with an epoxy-curing agent described below, and typical examples thereof include water-soluble diepoxides. Water-soluble epoxy compounds which may be preferably used in the present invention include compounds represented by the following formula.

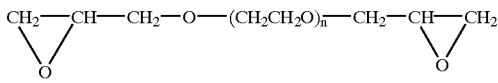

wherein n is a natural number of 4 to 9.

Examples of preferred water-soluble epoxy compounds include polyethylene glycol glycidyl ether. Commercially available water-soluble epoxy compounds usable herein include Epolight 400E (polyethylene glycol #400 glycidyl ether, manufactured by Kyoeisha Chemical Co., Ltd.), Epolight 200E (polyethylene glycol #200 glycidyl ether, manufactured by Kyoeisha Chemical Co., Ltd.), Epolight 80MF (glycerin diglycidyl ether, manufactured by Kyoeisha Chemical Co., Ltd.), Epiall G-100 (glycerin diglycidyl ether, manufactured by Nippon Oils & Fats Co., Ltd.), and Denacol (manufactured by Nagase Chemicals Ltd.).

Examples of epoxy-containing compounds, having a functional group reactive with an epoxy group, which may be preferably used in the present invention include those, among the above epoxy-containing resin emulsions, wherein at least part of $R^2$ contains a functional group reactive with an epoxy group, that is, a functional group selected from hydroxyl, carboxyl, and sulfonic groups. It is also possible to use an epoxy-containing compound wherein $R^2$ partly contains an alkyl group, preferably a $C_{1-21}$ alkyl, and does not contain any functional group reactive with an epoxy group. Commercially available epoxy-containing compounds of the above type include Almatex Z116 (manufactured by Mitsui Toatsu Chemicals, Inc.).

The content of the epoxy-containing compound in the ink composition according to the present invention is preferably about 1 to 10% by weight, more preferably 1 to 5% by weight, based on the ink composition.

The ink composition used in the present invention may contain a resin emulsion as described below. When the above epoxy-containing compound is an epoxy-containing resin emulsion, it serves also as the resin emulsion. Therefore, use of an additional resin emulsion is unnecessary. However, according to a preferred embodiment of the present invention, the resin emulsion is added in combination with the epoxy-containing resin emulsion.

In the present invention, preferably, an epoxy-curing agent may be incorporated into the reaction solution. This epoxy-curing agent refers to an agent which, together with the epoxy-containing compound contained in the ink composition, accelerates resinification (an increase in molecular weight) of the epoxy-containing compound by crosslinking. According to the present invention, any epoxy-curing agent may be utilized without any limitation so far as it can offer a printed image having good scratch resistance and waterfastness in the ink jet recording method described below.

Epoxy-curing agents which may be preferably used in the present invention are typically soluble in water. Examples thereof include amine compounds, for example, ethylenediamine, diethylaminopropylamine, N-aminoethylpiperazine, trimethylhexamethylenediamine, modified aliphatic amines, water-soluble polyamines, water-soluble cold curing catalysts other than amines, for example, aromatic sulfonic acid, such as p-phenolsulfonic acid, and curing agents for epoxy emulsions. It is also possible to utilize commercially available curing agents, and examples thereof include Almatex H700 (manufactured by Mitsui Toatsu Chemicals, Inc.) and EPOKY-H (manufactured by Mitsui Toatsu Chemicals, Inc.).

The concentration of the epoxy-curing agent in the reaction solution is preferably about 0.1 to 40% by weight, more preferably about 1 to 20% by weight.

According to the present invention, upon printing of an ink composition on a recording medium with a reaction solution deposited thereon, an epoxy-curing agent contained in the reaction solution is reacted with an epoxy-containing compound contained in the ink composition, to permit crosslinking of the epoxy-containing compound to proceed. This reaction may be expressed, for example, by the following formula:

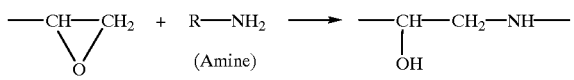

This accelerates the resinification of the epoxy-containing compound (a further increase in molecular weight of the resin emulsion). The above resinification in a printed image formed on a recording medium permits the printed image to be strongly adhered to the recording medium and, in addition, results in the formation of a resin film on the surface of the printed image. Thus, the print has good scratch resistance, waterfastness, and lightfastness.

Resin emulsion

According to a preferred embodiment of the present invention, the ink composition used in the present invention contains a resin emulsion. A preferred resin emulsion comprises a continuous phase of water and a dispersed phase comprising a resin not containing an epoxy group. As described above, when the epoxy-containing compound is an epoxy-containing resin emulsion, the addition of the resin emulsion is not essential. Resins usable herein include acrylic resin, vinyl acetate resin, styrene-butadiene resin, vinyl chloride resin, (meth)acrylate-styrene resin, butadiene resin, and styrene resin.

Further, commercially available resin emulsions may also be used, and examples thereof include Microgel E-1002 and E-5002 (styrene/acrylic resin emulsion, manufactured by Nippon Paint Co., Ltd.), Voncoat 4001 (acrylic resin emulsion, manufactured by Dainippon Ink and Chemicals, Inc.), Voncoat 5454 (styrene/acrylic resin emulsion, manufactured by Dainippon Ink and Chemicals, Inc.), SAE-1014 (styrene/acrylic resin emulsion, manufactured by Nippon Zeon Co., Ltd.), and Saivinol SK-200 (acrylic resin emulsion, manufactured by Saiden Chemical Industry Co., Ltd).

According to a preferred embodiment of the present invention, the resin is a polymer having a combination of a hydrophilic segment with a hydrophobic segment. The particle diameter of the resin component is not particularly limited so far as the resin component forms an emulsion. It, however, is preferably not more than about 150 nm, more preferably about 5 to 100 nm.

The resin emulsion may be prepared by subjecting a monomer(s) for forming a contemplated resin to dispersion polymerization in water optionally in the presence of a surfactant. For example, an emulsion of an acrylic resin or a styrene/acrylic resin may be prepared by subjecting an ester of (meth)acrylic acid or alternatively an ester of (meth)acrylic acid in combination with styrene to dispersion polymerization in water optionally in the presence of a surfactant. In general, the ratio of the resin component to the surfactant is preferably about 10:1 to 5:1. When the amount of the surfactant used falls within the above range, it is possible to provide an ink which has good water resistance in the form of an image and good penetrability. The surfactant is not particularly limited. Preferred examples thereof include anionic surfactants (for example, sodium dodecylbenzenesulfonate, sodium laurate and an ammonium salt of a polyoxyethylene alkyl ether sulfate); nonionic surfactants having 10 or more of HLB value (for example, a polyoxyethylene alkyl ether, a polyoxyethylene alkyl ester, a polyoxyethylene sorbitan fatty acid ester, a polyoxyethylene alkylamine, and a polyoxyethylene alkylamide). They may be used alone or as a mixture of two or more. Further, it is also possible to use acetylene glycol (OLFINE Y and Surfynol 82, 104, 440, 465, and 485 (all the above products being manufactured by Air Products and Chemicals Inc.).

The ratio of the resin as the component constituting the dispersed phase to water is suitably 60 to 400 parts by weight based on 100 parts by weight of the resin with 100 to 200 parts by weight, based on 100 parts by weight of the resin, of water being preferred.

The ratio of the resin as the component constituting the dispersed phase to water is suitably 60 to 400 parts by weight based on 100 parts by weight of the resin with 100 to 200 parts by weight, based on 100 parts by weight of the resin, of water being preferred.

In the ink used in the present invention, the amount of the resin emulsion incorporated therein is preferably such that the amount of the resin component is in the range of from 0.1 to 40% by weight, more preferably in the range of from 1 to 25% by weight.

For both the resin emulsion containing an epoxy group and the resin emulsion not containing an epoxy group, it is considered that interaction between these resin emulsions and the polyvalent metal ion inhibits the penetration of the colorant component and accelerates the fixation of the colorant component to the recording medium.

Reaction solution

The reaction solution used in the present invention basically comprises a polyvalent metal salt and/or polyallylamine and water. When the ink composition contains an epoxy-containing compound, the reaction solution preferably further comprises the above-described epoxy-curing agent.

According to the present invention, the polyvalent metal salt contained in the reaction solution may comprise a divalent or higher polyvalent metal ion and an ion bonded to the polyvalent metal, preferably a nitrate ion or a carboxylate ion and is soluble in water.

Furthermore, preferably, the carboxylate ions are derived from a saturated aliphatic monocarboxylic acid having 1 to 6 carbon atoms or a carbocyclic monocarboxylic acid having 7 to 11 carbon atoms. Preferred examples of the saturated aliphatic monocarboxylic acid having 1 to 6 carbon atoms include formic acid, acetic acid, propionic acid, butyric acid, isobutyric acid, valeric acid, isovaleric acid, pivalic acid, and hexanoic acid. Among them, formic acid and acetic acid are particularly preferred.

A hydrogen atom(s) on the saturated aliphatic hydrocarbon residue in the monocarboxylic acid may be substituted by a hydroxyl group. Preferred examples of such carboxylic acids include lactic acid.

Preferred examples of the carbocyclic monocarboxylic acid having 6 to 10 carbon atoms include benzoic acid and naphthoic acid with benzoic acid being more preferred.

Specific examples of polyvalent metallic ions include divalent metallic ions, such as $Ca^{2+}$, $Cu^{2+}$, $Ni^{2+}$, $Mg^{2+}$, $Zn^{2+}$, and $Ba^{2+}$, trivalent metallic ions, such as $Al^{3+}$, $Fe^{3+}$, and $Cr^{3+}$. Anions include $Cl^-$, $NO_3^-$, $I^-$, $Br^-$, $ClO_3^-$, and $CH_3COO^-$.

In particular, a metal salt constituted by $Ca^{2+}$ or $Mg^{2+}$ provides favorable results in terms of pH of the reaction solution and the quality of prints.

The concentration of the polyvalent metal salt in the reaction solution may be suitably determined so as to attain the effect of providing a good print quality and preventing clogging. It, however, is preferably about 0.1 to 40% by weight, more preferably about 5 to 25% by weight.

The polyallylamines usable in the reaction solution are cationic polymers which are soluble in water and can be positively charged in water. Such polymers include, for example, those represented by the following formulae (2), (3) and (4):

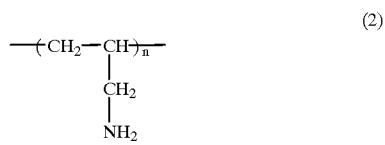

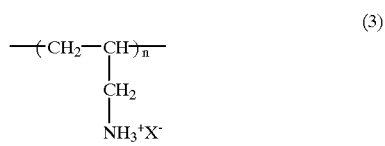

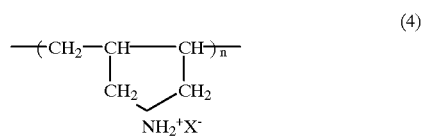

wherein X– represents at least one member selected from chloride, bromide, iodide, nitrate, phosphate, sulfate, acetate and other ions.

In addition, a copolymer of an allylamine with a diallylamine and a copolymer of diallylmethylammmonium chloride with sulfur dioxide may also be used.

The content of the polyallylamine and the polyallylamine derivative is preferably 0.5 to 10% by weight based on the reaction solution.

According to a preferred embodiment of the present invention, the reaction solution may comprise a wetting agent comprising a high-boiling organic solvent. The high-boiling organic solvent serves to prevent the reaction solution from being concentrated due to evaporation, thus preventing clogging of a recording head. Preferred examples of high-boiling organic solvents, some of which are those described above in connection with the ink composition.

Although the amount of the high-boiling organic solvent added is not particularly limited, it is preferably about 0.5 to 40% by weight, more preferably about 2 to 20% by weight.

According to a preferred embodiment of the present invention, triethylene glycol mono-butyl ether and glycerine are preferred. The amount of triethylene glycol mono-butyl ether and glycerine added in combination as the high-boiling organic solvent is preferably in the range of from 10 to 20% by weight, more preferably in the range of from 1 to 15% by weight.

Further, a colorant, e.g., yellow, magenta, or cyan colorant, may be added to the reaction solution so that the colored reaction solution can serve also as the ink composition described below in the paragraph of "Ink composition."

Further, if necessary, pH adjustors, preservatives, antimolds and the like may be added. Examples of pH adjustors include KOH, NaOH, triethanolamine. The amount of triethanolamine added is preferably in the range of 0 to 2.0 by weight.

Ink jet recording apparatus

An ink jet recording apparatus for practicing the ink jet recording method according to the present invention will now be described with reference to the accompanying drawings.

FIG. 1 is a diagram showing an embodiment of an ink jet recording apparatus. In this embodiment, an ink composition and a reaction solution are accommodated in a tank and fed into a recording head through an ink tube. Specifically, a recording head 1 is communicated with an ink tank 2 through an ink tube 3. The interior of the ink tank 2 is partitioned, and a chamber for an ink composition, optionally a plurality of chambers respectively for a plurality of color ink compositions, and a chamber for a reaction solution are provided.

The recording head 1 is carried by a carriage 4 and moved along a guide 9 by a timing belt 6 driven by a motor 5. On the other hand, paper 7 as a recording medium is placed by a platen 8 at a position facing the recording head 1. In this embodiment, a cap 10 is provided. A suction pump 11 is connected to the cap 10 in order to conduct the so-called "cleaning operation." The ink composition sucked by the pump 11 is resorvoired in a waste ink tank 13 through a tube 12.

FIG. 2 is an enlarged view showing the surface of nozzles for the recording head 1. In the drawing, the surface of a nozzle for a reaction solution is indicated by 1b, and a nozzle 21 for ejecting the reaction solution is provided in the longitudinal direction. On the other hand, the surface of nozzles for the ink composition is indicated by 1c, and a yellow ink composition, a magenta ink composition, a cyan ink composition, and a black ink composition are ejected respectively through nozzles 22, 23, 24 and 25.

Further, an ink jet recording method using the recording head shown in FIG. 2 will be described with reference to FIG. 3. The recording head 1 is moved in the direction indicated by an arrow A, during which time the reaction solution is ejected through the nozzle 21 to form a reaction solution-deposited region 31 in a band form on the recording medium 7. Subsequently, the recording medium 7 is transferred by a predetermined extent in the direction indicated by an arrow B, during which time the recording head 1 is moved the direction opposite to that indicated by the arrow A and returned to the left end of the recording medium 7, and the recording head conduct printing using the ink composition on the reaction solution-deposited region 31, thereby forming a print region 32.

Further, as shown in FIG. 4, in the recording head 1, it is also possible to arrange all nozzles in the lateral direction to construct a nozzle assembly. In the drawing, ejection nozzles for a reaction solution are denoted by 41a and 41b, and a yellow ink composition, a magenta ink composition, a cyan ink composition, and a black ink composition are ejected respectively through nozzles 42, 43, 44 and 45. In the recording head according to this embodiment, the recording head 1, when reciprocated on the carriage, can conduct printing in both directions. Therefore, in this case, printing at a higher speed is expected as compared with the case where the recording head shown in FIG. 2 is used.

Further, when the reaction solution and the ink composition are preferably adjusted so as to fall within the surface tension ranges described above, a high-quality print can be more stably provided regardless of the order of deposition of the reaction solution and the ink composition. In this case, even the provision of a single ejection nozzle suffices for satisfactory results. For example, in the drawing, the nozzle 41b may be omitted. This can contribute to a further reduction in size of the head and a further increase in printing speed.

Figure 5:
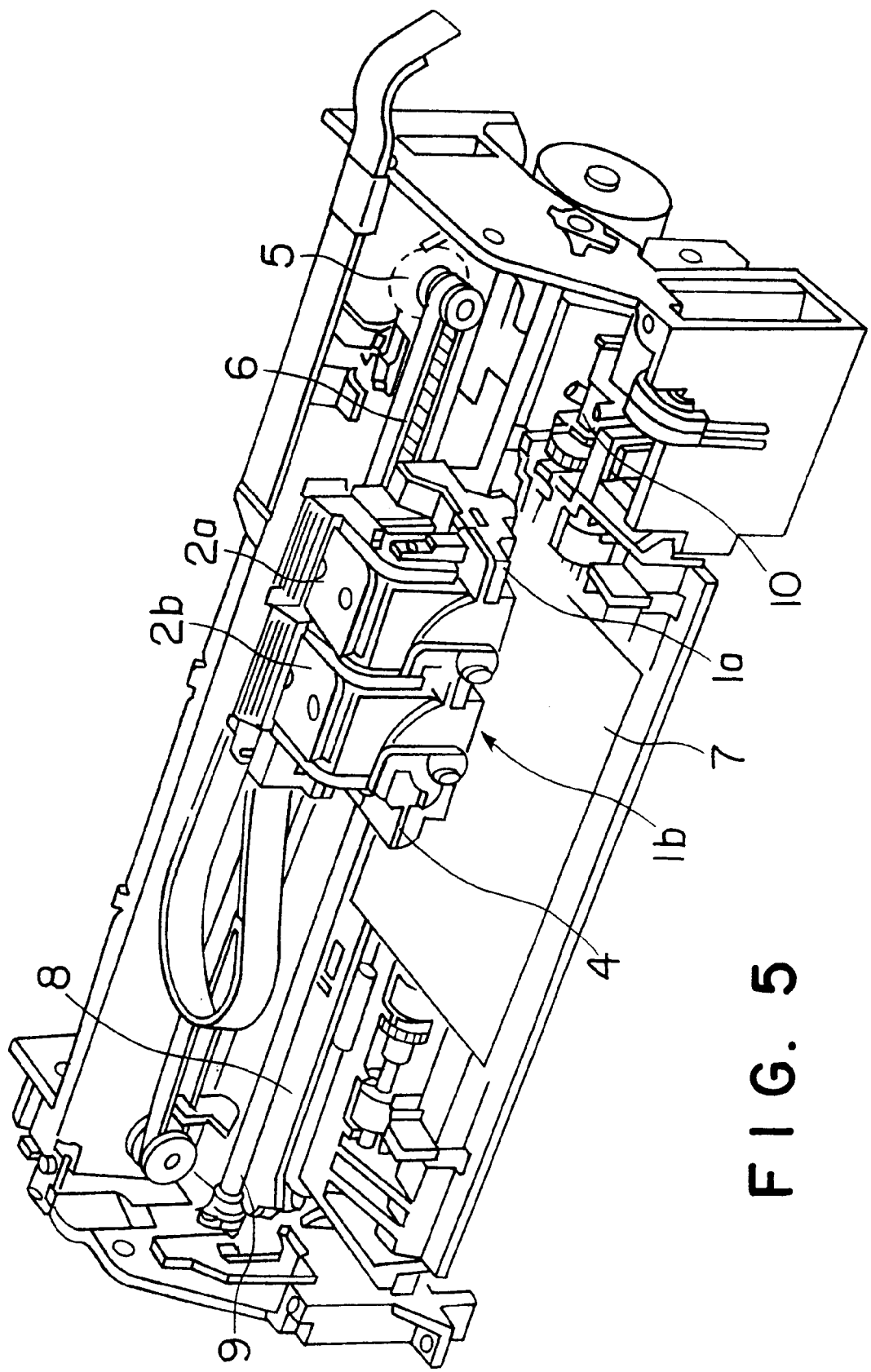
FIG. 5 shows an embodiment of the ink jet recording apparatus according to the present invention, wherein a recording head is integral with an ink tank.

In the ink jet recording apparatus, the supplement of the ink composition may be carried out by replacing an ink tank in a cartridge form. The ink tank may be integral with the recording head. A preferred embodiment of an ink jet recording apparatus using such an ink tank is shown in FIG. 5. In the drawing, the same members as used in the apparatus shown in FIG. 1 have the same reference numerals. In the embodiment shown in FIG. 5, recording heads 1a and 1b are integral respectively with ink tanks 2a and 2b. An ink composition and a reaction solution are ejected respectively through the recording heads 1a and 1b. Basically, printing may be conducted in the same manner as described above in connection with the apparatus shown in FIG. 1. Further, in this embodiment, the recording head 1a is moved together with the ink tank 2a on a carriage 4, while the recording head 1a is moved together with the ink tank 2b on the carriage 4.

EXAMPLES

The present invention will now be described in more detail with reference to the following examples, though it is not limited to these examples only.

Preparation of ink compositions

The following ink compositions were prepared.

| Black ink A1 | |
|---|---|
| Carbon black MA7 (manufactured by Mitsubishi Kasei Corp.) | 5% by weight |
| Styrene/acrylic acid copolymer (dispersant) | 1% by weight |
| Snowtex S (colloidal silica, $SiO_2$ content 30%, manufactured by Nissan Chemical Industry Ltd.) | 10% by weight |
| Sucrose | 0.7% by weight |
| Maltitol | 6.3% by weight |
| Glycerin | 10% by weight |
| 2-Pyrrolidone | 2% by weight |
| Ethanol | 4% by weight |
| Pure water | Balance |

Carbon black and the dispersant were mixed together and dispersed by means of a sand mill (manufactured by Yasukawa Seisakusho) with glass beads (diameter: 1.7 mm, amount: 1.5 times, by weight, the amount of the mixture) for 2 hr. Thereafter, the glass beads were removed, and the remaining additives were added, and the mixture was stirred at room temperature for 20 min and then filtered through a 5-$\mu$m membrane filter to prepare an ink for ink jet recording.

| Black ink A2 | |
|---|---|
| Carbon black Raven 1080 (manufactured by Columbian Carbon) | 5% by weight |
| Styrene/acrylic acid copolymer (dispersant) | 1% by weight |
| Snowtex C (coloidal silica, ($SiO_2$ content 20%), manufactured by Nissan Chemical Industry Ltd.) | 0.5% by weight |
| Sucrose | 0.7% by weight |

-continued

| | |
|---|---|
| Maltitol | 6.3% by weight |
| Glycerin | 10% by weight |
| 2-Pyrrolidone | 2% by weight |
| Ethanol | 4% by weight |
| Pure Water | Balance |
| Black ink A3 | |
| Carbon black Raven 1080 | 5% by weight |
| Styrene/acrylic acid copolymer (dispersant) | 1% by weight |
| Snowtex S | 5% by weight |
| Voncoat 4001 (acrylic resin emulsion, resin content 50%, MFT 5° C., manufactured by Dainippon Ink and Chemicals, Inc.) | 5% by weight |
| Sucrose | 0.7% by weight |
| Maltitol | 6.3% by weight |
| Glycerin | 10% by weight |
| 2-Pyrrolidone | 2% by weight |
| Ethanol | 4% by weight |
| Pure water | Balance |
| Black ink A4 | |
| C.I. Food Black | 2% by weight |
| Snowtex C | 10% by weight |
| 2-Pyrrolidone | 5% by weight |
| Pure water | Balance |
| Black ink A5 | |
| C.I. Food Black | 2% by weight |
| Aluminasol-200 (Al$_2$O$_3$ content 10%, manufactured by Nissan Chemical Industry Ltd.) | 5% by weight |
| 2-Pyrrolidone | 5% by weight |
| Pure water | Balance |
| Black ink A6 | |
| C.I. Food Black | 2% by weight |
| 2-Pyrrolidone | 5% by weight |
| Pure water | Balance |
| Black ink A7 | |
| Carbon black Raven 1080 | 5% by weight |
| Styrene/acrylic acid copolymer (dispersant) | 1% by weight |
| Sucrose | 0.7% by weight |
| Maltitol | 6.3% by weight |
| Glycerin | 10% by weight |
| 2-Pyrrolidone | 2% by weight |
| Ethanol | 4% by weight |
| Pure water | Balance |

The following colorants were added to the following liquid media to prepare cyan, magenta, and yellow ink compositions as a color ink set.

| Color ink set A1 | |
|---|---|
| Dye | |
| Cyan ink C.I. Direct Blue 86 | 3% by weight |
| Magenta ink C.I Direct Red 9 | 3% by weight |
| Yellow ink C.I. Acid Yellow 23 | 3% by weight |
| Liquid medium | |
| Snowtex C | 5% by weight |
| Diethylene glycol | 10% by weight |
| Surfynol 82 | 3% by weight |
| Surfynol TG | 0.5% by weight |
| Pure water | Balance |

-continued

| Color ink set A2 | |
|---|---|
| Pigment | |
| Cyan ink Pigment KETBLUEEX-1 (manufactured by Dainippon Ink and Chemicals, Inc.) | 2% by weight |
| Magenta ink Pigment KETRED 309 (manufactured by Dainippon Ink and Chemicals, Inc.) | 2% by weight |
| Yellow ink Pigment KETYELLQW 403 (manufactured by Dainippon Ink and Chemicals, Inc.) | 2% by weight |
| Liquid medium | |
| Styrene/acrylic acid copolymer (dispersant) | 0.4% by weight |
| Colloidal silica S | 3% by weight |
| Sucrose | 0.7% by weight |
| Maltitol | 6.3% by weight |
| Glycerin | 10% by weight |
| 2-Pyrrolidone | 2% by weight |
| Ethanol | 4% by weight |
| Pure water | Balance |

The following ingredients were mixed together to prepare reaction solutions.

| Reaction solution A1 | |
|---|---|
| Magnesium acetate hexahydrate (magnesium acetate 14.8% by weight) | 25% by weight |
| Diethylene glycol | 10% by weight |
| Pure water | Balance |
| Reaction solution A2 | |
| Calcium chloride | 10% by weight |
| Diethylene glycol | 10% by weight |
| Pure water | Balance |

Reaction solution A3

The following dyes were added to the following liquid medium to prepare reaction solutions serving also as cyan, magenta, and yellow color ink compositions.

| Dye | |
|---|---|
| Cyan ink C.I. Direct Blue 86 | 3% by weight |
| Magenta ink C.I. Direct Red 9 | 3% by weight |
| Yellow ink C.I. Acid Yellow 23 | 3% by weight |
| Liquid medium | |
| Calcium chloride | 10% by weight |
| Glycerin | 10% by weight |
| Pure water | Balance |

The above ink compositions and reaction solutions were combined as specified in Table 1, and the combinations were evaluated by tests described below.

TABLE 1

|  | Black ink | Color ink set | Reaction solution |
|---|---|---|---|
| Example | | | |
| A-1 | A1 | — | A1 |
| A-2 | A2 | — | A2 |
| A-3 | A3 | — | A2 |
| A-4 | A4 | — | A2 |
| A-5 | A5 | — | A1 |
| A-6 | A1 | A1 | A2 |
| A-7 | A1 | A2 | A2 |
| A-8 | A1 | — | A3 |
| A-9 | A1 | — | — |
| Comparative Example | | | |
| A1 | A5 | — | — |
| A2 | A6 | — | A2 |
| A3 | A6 | — | — |

Evaluation A1: Print quality (feathering)

An ink jet printer MJ-700V2C (manufactured by Seiko Epson Corporation) was used to perform printing on the following various papers. In the printing, the reaction solution was first printed (100% duty), and the black ink was then used to print a letter. After drying, the prints were inspected for feathering in the letter.
(1) Xerox P Paper (Xerox Corp.)
(2) Ricopy 6200 Paper (Ricoh Co. Ltd.)
(3) Xerox 4024 Paper (Xerox Corp.)
(4) Neenah Bond Paper (Kimberly-Clark)
(5) Xerox R Paper (recycled paper, Xerox Corp.)
(6) Yamayuri (recycled paper, Honshu Paper Co., Ltd.)

The results were as tabulated in Table 2. Regarding the results given in the table, the evaluation criteria are as follows.
  ○: Sharp print without any feathering
  Δ: Feathering observed
  X: Remarkable feathering observed rendering the outline of the letter blurry Evaluation A2: Unevenness of printing An ink jet printer MJ-700V2C was used to perform printing (100% duty) on the following various papers. The printing method was the same as described above in connection with the evaluation of the print quality (feathering).
(1) Ricopy 6200 Paper (Ricoh Co. Ltd.)
(2) Canon dry Paper (Canon Inc.)

For the resultant print images, the reflection OD was measured with Macbeth PCMII (manufactured by Macbeth). This measurement was performed for randomly selected five points in the print area, and the average of the measured values was determined. This procedure was repeated five times, and the maximum value and the minimum value in the five average values were determined. When the difference between the maximum value and the minimum value is less than 0.5, there is no problem for practical use with the difference being preferably less than 0.4. The results were as tabulated in Table 2. In the results given in the; table, the evaluation criteria were as follows.
  ○: OD difference of less than 0.3
  Δ: OD difference of 0.3 to less than 0.4
  X: OD difference of not less than 0.4

Evaluation A3: Rubbing property

An ink jet printer MJ-700V2C was used to perform printing on Xerox P paper (manufactured by Xerox Corp.),, and the resultant prints were air-dried for 24 hr. The prints were rubbed with a finger under an environment of 25° C. and 50% RH and then observed by visible inspection for the presence of a stain on the print. The results were as tabulated in Table 2. In the table, the evaluation criteria were as follows.
  ○: No stain observed in the print
  Δ: Slight stain observed in the print with the letter being still legible
  X: Stain observed in the print rendering the letter illegible Evaluation A4: Color bleeding An ink jet printer MJ-700V2C was used in this evaluation test. The reaction solution was deposited (100% duty) on the following recording media, and color inks (cyan, magenta, and yellow) (100% duty) and the black ink (a letter) were simultaneously printed to examine the prints for the presence of uneven color-to-color mixing in the letter boundaries. In this case, in Example 8, the reaction solution (100% duty) and the black ink (a letter) were simultaneously printed.
(1) Xerox P Paper (Xerox Corp.)
(2) Ricopy 6200 Paper (Ricoh Co. Ltd.)
(3) Xerox 4024 Paper (Xerox Corp.)
(4) Neenah Bond Paper (Kimberly-Clark)
(5) Xerox R Paper (recycled paper, Xerox Corp.)
(6) Yamayuri (recycled paper, Honshu Paper Co.)

The results were as tabulated in Table 2. In the table, the evaluation criteria were as follows.
  ○: No color-to-color mixing observed with clear letter boundaries
  Δ: Feather-like color-to-color mixing observed
  X: Significant color-to-color mixing observed rendering the outline of the letter blurry Evaluation A5: Fixability onto specialty media An ink jet printer MJ-700V2C was used to print an ink on a specialty gloss paper for MJ-700V2C (manufactured by Seiko Epson Corporation), and the resultant prints were air-dried for 24 hr. The prints were rubbed with a finger under an environment of 25° C. and 50% RH and then visually inspected for the presence of a stain on the print and the separation of the colorant. The results were as tabulated in Table 2. In the table, the evaluation criteria were as follows.
  ○: Neither stain nor separated colorant observed in the print
  Δ: Slight stain observed in the print with separated colorant not observed in the print
  X: Both stain and separated colorant observed in the print

TABLE 2

|  | Evaluation | | | | |
|---|---|---|---|---|---|
|  | A1 | A2 | A3 | A4 | A5 |
| Example | | | | | |
| A1 | ○ | ○ | ○ | — | — |
| A2 | Δ | ○ | ○ | — | — |
| A3 | ○ | ○ | ○ | — | — |
| A4 | Δ | ○ | ○ | — | — |
| A5 | Δ | ○ | ○ | — | — |
| A6 | ○ | ○ | ○ | Δ | Δ |
| A7 | ○ | ○ | ○ | ○ | ○ |
| A8 | ○ | ○ | ○ | Δ | Δ |
| A9 | — | — | — | — | — |

TABLE 2-continued

|  | Evaluation | | | | |
|---|---|---|---|---|---|
|  | A1 | A2 | A3 | A4 | A5 |
| Comparative Example | | | | | |
| A1 | X | Δ | Δ | — | — |
| A2 | Δ | X | X | — | — |
| A3 | — | — | — | — | X |

The following ink compositions were prepared.

Black ink B1

| | |
|---|---|
| Carbon black MA7 (manufactured by Mitsubishi Kasei Corp.) | 5% by weight |
| Styrene/acrylic acid copolymer (dispersant) | 1% by weight |
| Almatex Z116 (epoxy-containing acrylic resin emulsion, resin content 50%, manufactured by Mitsui Toatsu Chemicals, Inc.) | 3% by weight |
| Snowtex S (colloidal silica, $SiO_2$ content 30%, manufactured by Nissan Chemical Industry Ltd.) | 2% by weight |
| Sucrose | 0.7% by weight |
| Maltitol | 6.3% by weight |
| Glycerin | 10% by weight |
| 2-Pyrrolidone | 2% by weight |
| Triethanolamine (pH adjustor) | 1.0% by weight |
| KOH (pH adjustor) | 0.1% by weight |
| Pure water | Balance |

Black ink B2

| | |
|---|---|
| Carbon black Raven 1080 (manufactured by Columbian Carbon Co., Ltd.) | 5% by weight |
| Styrene/acrylic acid copolymer (dispersant) | 1% by weight |
| Almatex Z116 (epoxy-containing acrylic resin emulsion, resin content 50%, manufactured by Mitsui Toatsu Chemicals, Inc.) | 3% by weight |
| Epolight 400E (water-soluble epoxy compound, polyethylene glycol #400 glycidyl ether, manufactured by Kyoeisha Chemical Co., Ltd.) | 2% by weight |
| Snowtex C (colloidal silica, $SiO_2$ content 20%, manufactured by Nissan Chemical Industry Ltd.) | 1% by weight |
| Sucrose | 0.7% by weight |
| Maltitol | 6.3% by weight |
| Glycerin | 10% by weight |
| 2-Pyrrolidone | 2% by weight |
| Ethanol | 4% by weight |
| Pure water | Balance |

Black ink B3

| | |
|---|---|
| Carbon black Raven 1080 | 5% by weight |
| Styrene/acrylic acid copolymer (dispersant) | 1% by weight |
| Microgel E-5002 (styrene/acrylic resin emulsion, resin content 29.2%, MFT about 80° C., manufactured by Nippon Paint Co., Ltd.) | 3.5% by weight |
| Almatex Z116 (epoxy-containing acrylic resin emulsion, resin content 50%, manufactured by Mitsui Toatsu Chemicals, Inc.) | 5% by weight |
| Snowtex S | 1% by weight |
| Sucrose | 0.7% by weight |
| Maltitol | 6.3% by weight |
| Glycerin | 10% by weight |
| 2-Pyrrolidone | 2% by weight |
| Triethanolamine (pH adjustor) | 1.0% by weight |
| KOH (pH adjustor) | 0.1% by weight |
| Pure water | Balance |

Black ink B4

| | |
|---|---|
| Carbon black Raven 1080 (manufactured by Columbian Carbon Co., Ltd.) | 5% by weight |
| Styrene/acrylic acid copolymer (dispersant) | 1% by weight |
| Microgel E-5002 (styrene/acrylic resin emulsion, resin content 29.2%, MFT about 80° C., manufactured by Nippon Paint Co., Ltd.) | 3.5% by weight |
| Epolight 400E (water-soluble epoxy compound, polyethylene glycol #400 glycidyl ether, manufactured by Kyoeisha Chemical Co., Ltd.) | 2% by weight |
| Snowtex C (colloidal silica, $SiO_2$ content 20%, manufactured by Nissan Chemical Industry Ltd.) | 1% by weight |
| Sucrose | 0.7% by weight |
| Maltitol | 6.3% by weight |
| Glycerin | 10% by weight |
| 2-Pyrrolidone | 2% by weight |
| Ethanol | 4% by weight |
| Pure water | Balance |

Black ink B5

| | |
|---|---|
| Carbon black Raven 1080 (manufactured by Columbian Carbon Co., Ltd.) | 5% by weight |
| Styrene/acrylic acid copolymer (dispersant) | 1% by weight |
| Sucrose | 0.7% by weight |
| Maltitol | 6.3% by weight |
| Glycerin | 10% by weight |
| 2-Pyrrolidone | 2% by weight |
| Ethanol | 4% by weight |
| Pure water | Balance |

Black ink B6

| | |
|---|---|
| Carbon black Raven 1080 (manufactured by Columbian Carbon Co., Ltd.) | 5% by weight |
| Styrene/acrylic acid copolymer (dispersant) | 1% by weight |
| Microgel E-5002 (styrene/acrylic resin emulsion, resin content 29.2%, MFT about 80° C., manufactured by Nippon Paint Co., Ltd.) | 3.5% by weight |
| Sucrose | 0.7% by weight |
| Maltitol | 6.3% by weight |
| Glycerin | 10% by weight |
| 2-Pyrrolidone | 2% by weight |
| Ethanol | 4% by weight |
| Pure water | Balance |

The above black inks were prepared as follows. Carbon black and the dispersant were mixed together and dispersed by means of a sand mill (manufactured by Yasukawa Seisakusho) with glass beads (diameter: 1.7 mm, amount: 1.5 times, by weight, the amount of the mixture) for 2 hr..

Thereafter, the glass beads were removed, and the remaining additives were added, and the mixture was stirred at room temperature for 20 min and then filtered through a 5-μm membrane filter to prepare an ink for ink jet recording.

Color ink set B1

Color ink set B1

Cyan ink

| | |
|---|---|
| Pigment KETBLUEEX-1 (manufactured by Dainippon Ink and Chemicals, Inc.) | 2% by weight |
| Styrene/acrylic acid copolymer (dispersant) | 1% by weight |
| Almatex Z116 (epoxy-containing acrylic resin emulsion, resin content 50%, manufactured by Mitsui Toatsu Chemicals, Inc.) | 3% by weight |
| Snowtex S (colloidal silica, $SiO_2$ content 30%, manufactured by Nissan Chemical Industry Ltd.) | 2% by weight |
| Sucrose | 0.7% by weight |
| Maltitol | 6.3% by weight |
| Glycerin | 10% by weight |
| 2-Pyrrolidone | 2% by weight |
| Ethanol | 4% by weight |
| Pure water | Balance |

Magenta ink

| | |
|---|---|
| Pigment KETRED309 (manufactured by Dainippon Ink and Chemicals, Inc.) | 2% by weight |
| Styrene/acrylic acid copolymer (dispersant) | 1% by weight |
| Almatex Z116 (epoxy-containing acrylic resin emulsion, resin content 50%, manufactured by Mitsui Toatsu Chemicals, Inc.) | 3% by weight |
| Snowtex S (colloidal silica, $SiO_2$ content 30%, manufactured by Nissan Chemical Industry Ltd.) | 2% by weight |
| Sucrose | 0.7% by weight |
| Maltitol | 6.3% by weight |
| Glycerin | 10% by weight |
| 2-Pyrrolidone | 2% by weight |
| Ethanol | 4% by weight |
| Pure water | Balance |

Yellow ink

| | |
|---|---|
| Pigment KETYELLOW403 (manufactured by Dainippon Ink and Chemicals, Inc.) | 2% by weight |
| Almatex Z116 (epoxy-containing acrylic resin emulsion, (resin content 50%), manufactured by Mitsui Toatsu Chemicals, Inc.) | 3% by weight |
| Snowtex S (colloidal silica, ($SiO_2$ content 30%), manufactured by Nissan Chemical Industry Ltd.) | 2% by weight |
| Sucrose | 0.7% by weight |
| Maltitol | 6.3% by weight |
| Glycerin | 10% by weight |
| 2-Pyrrolidone | 2% by weight |
| Ethanol | 4% by weight |
| Pure water | Balance |

Color ink set B2

Cyan ink

| | |
|---|---|
| Pigment KETBLUEEX-1 (manufactured by Dainippon Ink and Chemicals, Inc.) | 2% by weight |
| Styrene/acrylic acid copolymer (dispersant) | 1% by weight |
| Sucrose | 0.7% by weight |
| Maltitol | 6.3% by weight |
| Glycerin | 10% by weight |
| 2-Pyrrolidone | 2% by weight |
| Ethanol | 4% by weight |
| Pure water | Balance |

Magenta ink

| | |
|---|---|
| Pigment KETRED309 (manufactured by Dainippon Ink and Chemicals, Inc.) | 2% by weight |
| Styrene/acrylic acid copolymer (dispersant) | 1% by weight |
| Sucrose | 0.7% by weight |
| Maltitol | 6.3% by weight |
| Glycerin | 10% by weight |
| 2-Pyrrolidone | 2% by weight |
| Ethanol | 4% by weight |
| Pure water | Balance |

Yellow ink

| | |
|---|---|
| Pigment KETYELLOW403 (manufactured by Dainippon Ink and Chemicals, Inc.) | 2% by weight |
| Sucrose | 0.7% by weight |
| Maltitol | 6.3% by weight |
| Glycerin | 10% by weight |
| 2-Pyrrolidone | 2% by weight |
| Ethanol | 4% by weight |
| Pure water | Balance |

The above color ink compositions were prepared as follows. The pigment and the dispersant were mixed together and dispersed by means of a sand mill (manufactured by Yasukawa Seisakusho) with glass beads (diameter: 1.7 mm, amount: 1.5 times, by weight, the amount of the mixture) for 2 hr. Thereafter, the glass beads were removed, and the remaining additives were added, and the mixture was stirred at room temperature for 20 min and then filtered through a 5-μm membrane filter to prepare an ink composition.

| Reaction solution B1 | |
|---|---|
| Magnesium nitrate hexahydrate | 25% by weight |
| Triethylene glycol monobutyl ether | 10% by weight |
| Glycerin | 20% by weight |
| Pure water | Balance |
| Reaction solution B2 | |
| Magnesium nitrate hexahydrate | 25% by weight |
| Water-soluble polyamine (Almatex H700, manufactured by Mitsui Toatsu Chemicals, Inc.) | 3% by weight |
| Triethylene glycol monobutyl ether | 10% by weight |
| Glycerin | 20% by weight |
| Pure water | Balance |

The above reaction solutions were prepared by mixing the ingredients together, stirring the mixture at room temperature for one hr, and subjecting the stirred mixture to suction filtration through a 5 μm-membrane filter at room temperature.

Print evaluation test

Predetermined printing was carried out using combinations of the above ink compositions with the above reaction solutions. The printed images thus obtained were evaluated as follows.

Printing method

An ink jet printer MJ-700V2C (manufactured by Seiko Epson Corporation) was used to perform printing on the following various papers. In the printing, the reaction solution was first printed (100% duty), and the black ink was used to print a letter. In this case, for both the reaction solution and the ink, the amount of the ink ejected was 0.07 µg/dot with the density being 360 dpi. Papers for printing test:

(1) Xerox P Paper (Xerox Corp.)
(2) Ricopy 6200 Paper (Ricoh Co. Ltd.)
(3) Xerox 4024 Paper (Xerox Corp.)
(4) Neenah Bond Paper (Kimberly-Clark)
(5) Xerox R Paper (recycled paper, Xerox Corp.)
(6) Yamayuri (recycled paper, Honshu Paper Co., Ltd.)

Evaluation B1: Rubbing resistance test (line marking resistance)

The resultant prints were air-dried and then rubbed with a water-base yellow fluorescent marker pen (ZEBRA PEN 2, manufactured by ZEBRA) at a marking force of $4.9 \times 10^5$ N/m$^2$, and the degree of stain in the yellow area was visually inspected. The results were evaluated based on the following criteria.

⊚: No stain created by marking twice immediately after printing

○: No stain created by marking twice 24 hr after printing

Δ: No stain created by marking once with some paper being stained by marking twice or 24 hr after printing X: Some paper stained by marking once 24 hr after printing Evaluation B2: Print quality (feathering)

Letters after drying the resultant prints were inspected for feathering, and the results were evaluated as follows.

⊚: Sharp without any feathering for all the papers

○: Feathering observed for some papers (recycled paper)

Δ: Feathering observed for all the papers

X: Remarkable feathering observed rendering the outline of the letter blurry

Evaluation B3: OD value

The reflection optical density (OD) of prints provided by the above method was measured with Macbeth PCMII (manufactured by Macbeth).

The reaction solutions and the ink compositions used in the evaluations B1 to B3, and the results of evaluation were as tabulated in Table 3.

TABLE 3

|  | Reaction solution | Black ink | Evaluation B1 | B2 | B3 |
| --- | --- | --- | --- | --- | --- |
| Example |  |  |  |  |  |
| B1 | B1 | B1 | ○ | ⊚ | 1.65 |
| B2 | B1 | B2 | ○ | ⊚ | 1.62 |
| B3 | B1 | B3 | ○ | ⊚ | 1.60 |
| B4 | B1 | B4 | ○ | ⊚ | 1.59 |
| B5 | B2 | B1 | ⊚ | ⊚ | 1.68 |
| B6 | B2 | B2 | ⊚ | ⊚ | 1.65 |
| B7 | B2 | B3 | ⊚ | ⊚ | 1.63 |
| B8 | B2 | B4 | ⊚ | ⊚ | 1.62 |
| Compartive Example |  |  |  |  |  |
| B1 | B1 | B5 | X | X | 1.32 |
| B2 | B1 | B6 | Δ | ○ | 1.42 |

Evaluation B4: Color bleed

An ink jet printer MJ-700V2C was used in this evaluation test. The reaction solution was deposited (100% duty) on the above various papers as a recording paper, and color inks (cyan, magenta, and yellow) (100% duty) were simultaneously printed. The prints were visually inspected for the presence of uneven color-to-color mixing in the boundaries between the colors. The results were evaluated based on the following criteria:

○: No color-to-color mixing observed.

Δ: Feather-like color-to-color mixing observed.

X: Significant color-to-color mixing observed.

The results were as tabulated in Table 4.

TABLE 4

|  | Reaction solution | Color ink set | Evaluation B4 |
| --- | --- | --- | --- |
| Example |  |  |  |
| B9 | B1 | B1 | ○ |
| B10 | B2 | B1 | ○ |
| Comparative Example |  |  |  |
| B3 | B1 | B2 | X |

Evaluation B5: Fixation of ink on specialty medium (part 1)

An ink jet printer MJ-700V2C (manufactured by Seiko Epson Corporation) was used to perform printing on a specialty gloss film for the ink jet printer MJ-700V2C (manufactured by Seiko Epson Corporation), and the resultant prints were air-dried for 24 hr. The prints were examined in the same manner as described in Evaluation B1. The results were evaluated based on the following criteria:

○: No stain created in the print by rubbing once

Δ: Slight stain created in the print by rubbing once

X: Stain created in the print by rubbing once

Evaluation B6: Fixation of ink on specialty medium (part 2)

A pressure-sensitive adhesive tape (cellophane tape: Sekisui Tape, manufactured by Sekisui Chemical Co., Ltd.) was applied to the printed area in the prints, rubbed twice or thrice with a finger, and then peeled off. Thereafter, the printed area from which the pressure-sensitive adhesive tape has been peeled off was visually inspected, and the results were evaluated based on the following criteria:

○: Ink (colorant) not separated from the surface of the specialty gloss film

Δ: Ink present in both the surface of the specialty gloss film and the surface of a pressure-sensitive adhesive in the pressure-sensitive adhesive tape X: Ink (colorant) completely separated from the surface of the specialty gloss film The results were as tabulated in Table 5.

TABLE 5

|  | Black ink | Evaluation B5 | Evaluation B6 |
| --- | --- | --- | --- |
| Example |  |  |  |
| B11 | B1 | ○ | ○ |
| B12 | B2 | ○ | ○ |
| B13 | B3 | ○ | ○ |
| B14 | B4 | ○ | ○ |

TABLE 5-continued

| | Black ink | Evaluation B5 | Evaluation B6 |
|---|---|---|---|
| Comparative Example | | | |
| B5 | B5 | X | X |
| B6 | B6 | Δ | Δ |

What is claimed is:

1. An ink jet recording method comprising the step of:
depositing a reaction solution and an ink composition onto a recording medium to perform printing,
wherein the reaction solution contains a polyvalent metal salt and/or a polyallylamine,
wherein the ink composition comprises at least a colorant, an inorganic oxide colloid, and an aqueous solvent, and
wherein the ink composition further comprises an epoxy-containing compound having a functional group reactive with an epoxy group.

2. The method according to claim 1, wherein the epoxy-containing compound is an epoxy-containing resin emulsion and/or a water-soluble epoxy compound.

3. The method according to claim 1, wherein the epoxy-containing resin emulsion comprises a copolymer comprising recurring units represented by the following formulae (I) and (II):

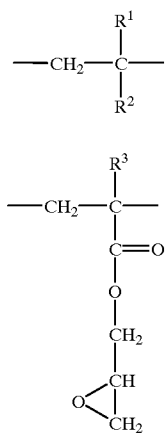

wherein
$R^1$ and $R^3$ independently represent H or $CH_3$,
$R^2$ represents a group containing at least one member selected from alkyl, hydroxyl, carboxyl, and sulfonic groups.

4. The method according to claim 2, wherein the water-soluble epoxy compound is represented by the following formula:

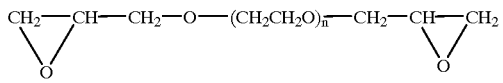

wherein n is a natural number of 4 to 9.

5. The method according to claim 1, wherein the ink composition further comprises a resin emulsion.

6. The method according to claim 1, wherein the reaction solution further comprises an epoxy-curing agent.

7. The method according to claim 6, wherein the epoxy-curing agent is a water-soluble polyamine.

8. In a method for forming print on a recording medium by depositing an ink composition and a reaction solution onto the recording medium so that the reaction solution reacts with the ink composition to form the print with desired properties, said ink composition comprising a colorant and an aqueous solvent, said reaction solution comprising a polyvalent metal salt or a polyallylamine, the improvement comprising providing the ink composition with an inorganic oxide colloid and an epoxy-containing compound having a functional group reactive with an epoxy group, said inorganic oxide colloid being present in the ink composition in an amount sufficient to form the print with an improved rubbing resistance or evenness of printing as compared to the print formed with the ink composition without the inorganic oxide colloid.

9. The method according to claim 8, wherein the ink composition comprises the colorant in an amount of about 0.5 to 25% by weight, the epoxy-containing compound in an amount of about 1 to 10% by weight, and the inorganic oxide colloid in an amount of about 0.1 to 15% by weight; and wherein the reaction solution comprises water, an organic solvent in an amount of about 0.5 to 40% by weight and the polyvalent metal salt in an amount of about 0.1 to 40% by weight and/or the polyallylamine in an amount of about 0.5 to 10% by weight.

* * * * *